United States Patent [19]

Tiedeman

[11] Patent Number: 4,579,201

[45] Date of Patent: Apr. 1, 1986

[54] BIDIRECTIONAL, TORQUE-LIMITING, NO-BACK CLUTCH MECHANISM

[75] Inventor: Robert K. Tiedeman, Wayne, N.J.

[73] Assignee: Curtiss Wright Flight Systems, Inc., Fairfield, N.J.

[21] Appl. No.: 495,068

[22] Filed: May 16, 1983

[51] Int. Cl.⁴ .................. F16D 67/02; F16D 7/00
[52] U.S. Cl. ...................... 192/8 C; 192/16; 192/56 C; 192/110 R; 192/144; 192/150; 188/134
[58] Field of Search ............... 192/56 C, 6 R, 7, 8 R, 192/8 C, 12 BA, 15, 16, 17 D, 144, 150, 110 R; 188/134

[56] References Cited

U.S. PATENT DOCUMENTS

| | | | |
|---|---|---|---|
| 3,329,242 | 7/1967 | Minarick et al. | 192/7 R |
| 3,659,682 | 5/1972 | Meyer et al. | 188/134 |
| 3,726,370 | 4/1973 | Hubbard | 192/8 C |
| 3,898,817 | 8/1975 | Capewell et al. | 192/7 |
| 4,006,785 | 2/1977 | Roll et al. | 192/150 |
| 4,071,092 | 1/1978 | Wallace | 192/150 |

Primary Examiner—George H. Krizmanich

[57] ABSTRACT

The bidirectional, torque-limiting, drive and brake mechanism has an input and output drive shafts and a helical spring which is normally in interference fit with the mechanism housing and, in the torque transmitting mode of operation, is disengaged to permit torque transmission by a direct mechanical coupling between the input and output drive shafts. The torque-limiting component, which functions to interrupt transmission of rotation from the input drive shaft to the output drive shaft upon a predetermined torque load, is adjustable to a selected predetermined torque load in the field.

15 Claims, 9 Drawing Figures

BIDIRECTIONAL, TORQUE-LIMITING, NO-BACK CLUTCH MECHANISM

This invention relates to spring clutches and, more particularly, to a bidirectional, torque-limiting, drive and brake, clutch mechanism.

BACKGROUND OF THE INVENTION

In heretofore bidirectional, torque-limiting, brake spring clutch mechanism, as is exemplified in the U.S. Pat. No. 3,329,242 to Minarick et al and U.S. Pat. No. 3,659,682, to Meyer et al the driving torque is undesirably transmitted from the input drive shaft through the interference fit between the helical spring and an output shaft or drum of the clutch mechanism. In addition, since torque-limiting is achieved in such heretofore known torque-limiting, brake spring clutch mechanism by interrupting the interference fit of the helical spring, the torque-limiting load value as a function of spring force, is determined at the time of manufacture of the mechanism and is not thereafter readily adjustable in the field. Accordingly, the present invention contemplates a bidirectional, torque-limiting drive and brake mechanism or relatively simple and compact construction which does not have the aforesaid disadvantages of heretofore known spring clutch mechanisms of the bidirectional torque limiting and brake type.

Accordingly, an object of this invention is to provide a bidirectional, torque-limiting, drive and brake mechanism in which a driving torque is transmitted by a direct mechanical interconnection of driving parts and is not dependent upon an interference spring fit. Another object of the present invention is to provide a bidirectional, torque-limiting, drive and brake mechanism in which the torque-limiting load value is readily adjustable in the field after manufacture. A still further object of this invention is to provide a bidirectional, torque-limiting, drive and brake mechanism wherein the spring only functions as a brake and thus has a longer operative life than heretofore known spring clutch mechanisms of the same type.

SUMMARY OF THE INVENTION

The present invention contemplates a bidirectional, torque-limiting, drive and brake mechanism which comprises an input drive means and an output drive means supported for rotation in a housing having a fixed braking surface. A helically wound spring is disposed in the housing in normal interference fit with said braking surface. A torque limiting means is provided to interconnect the input and output drive means for transmission of rotation from the input drive means to the output drive means and interrupt such transmission of rotation when a predetermined torque load is reached. The torque-limiting means also includes a drive means for engaging the output drive means and rotatively driving the latter at torque loadings below the predetermined torque load. A switching sleeve is connected to the torque-limiting means for conjoined rotation therewith and has an abutment means for engaging the opposite ends of the spring and thereby effect release of the spring from said interference fit with the braking surface and permit the drive means to rotatively drive the output drive means and, upon a predetermined torque load, allow the spring to reengage the braking surface and prevent rotation of the input and output drive means.

In a narrower aspect of the present invention, the torque-limiting means of the bidirectional, torque-limiting, drive and brake mechanism is of the ball and inclined-ramp type consisting of a plurality of circumferentially spaced balls supported between a first collar and a second collar for movement in arcuate shaped inclined grooves formed in at least one of the surfaces of the first and second collars. The first and second collars are supported for rotative movement and the second collar is also supported for axial movement away from the first collar under the urging of the balls when the first collar rotatively overrides the second collar.

A feature of this invention is an adjustment means cooperatively associated with the torque limiting means whereby the latter is adjustable to a predetermined torque load value relatively quickly and easily in the field.

BRIEF DESCRIPTION OF THE DRAWINGS

The invention will be more fully understood from the following description when considered in connection with the accompanying drawings in which:

FIG. 8b is an exploded view of the other component parts of the clutch mechanism not shown in FIG. 8a.

DESCRIPTION OF PREFERRED EMBODIMENT

Figure 1:
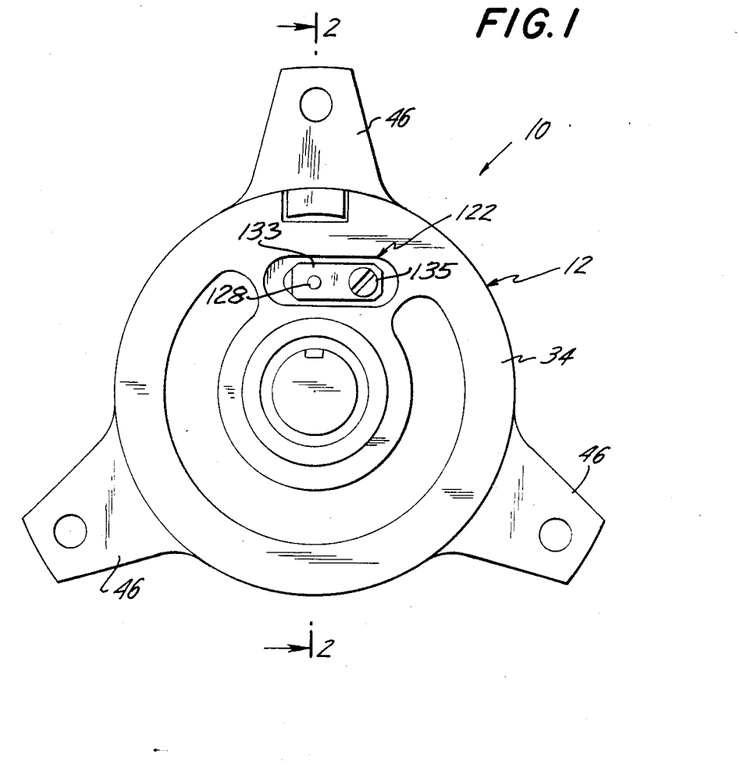
FIG. 1 is an end view of the bidirectional, torque-limiting, drive and brake mechanism according to this invention.
Figure 2:
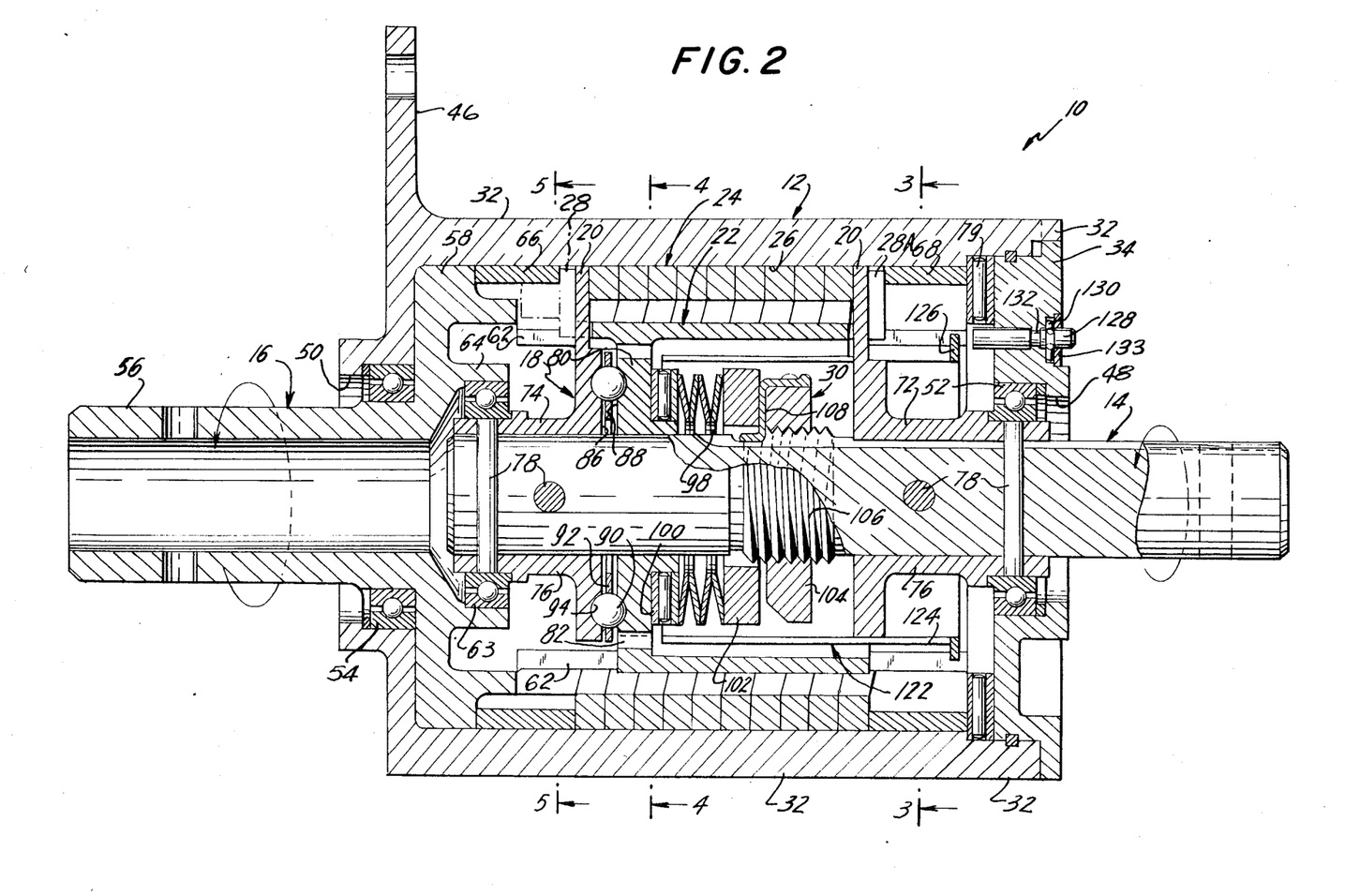
FIG. 2 is a longitudinal, cross sectional view taken along line 2—2 of FIG. 1, somewhat enlarged.
Figure 7:
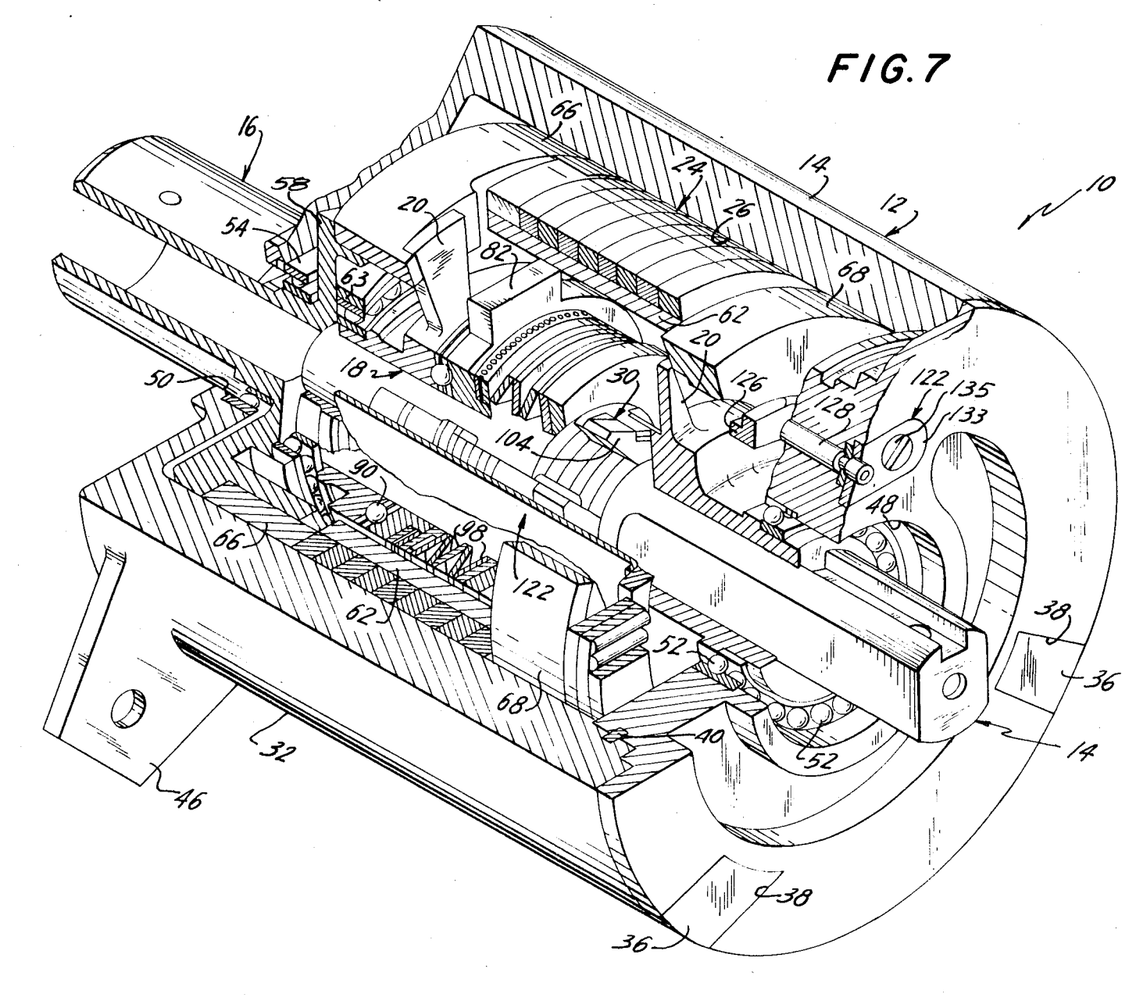
FIG. 7 is a perspective view of the drive and brake mechanism according to this invention with parts cut-away to more fully disclose the component parts of the drive and brake mechanism.

Now, referring to the drawings and, more specifically, to FIGS. 1, 2 and 7, the bidirectional, torque-limiting, drive and brake mechanism, according to this invention, is generally designated by the reference number 10. The clutch mechanism 10, while having broad and varied application, is particularly suited for torque transmission systems such as wing flap and slat actuation systems or door actuation systems for aircraft, where interruption of torque transmission upon a temporary overload condition is required and where normal torque transmission is automatically restored upon elimination of the overload condition.

MAJOR COMPONENTS

The clutch mechanism 10 in general comprises a housing 12 in which an input drive shaft 14 and an output drive shaft 16 are supported for rotation. The input drive shaft 14 is connected to a source (not shown) of bidirectional rotary power, while output drive shaft 16 is connected to a member to be rotated (not shown), such as a wing flap or slat. A torque limiting subassembly or means 18 is disposed within the housing to interconnect the input and output drive shafts 14 and 16 for torque transmission and interruption of such transmission when a predetermined torque loading occurs. The torque limiting means 18 (see FIGS. 2 and 7) includes a drive means 20 for engaging the output drive shaft 16 and rotatively driving the latter. A switching sleeve 22 overlies and is connected to the torque limiting means 18 so that the switching sleeve 22 rotates together with rotation of the torque limiting means. A helically wound spring 24 is disposed within housing 12 to surround and lie substantially coaxially to switching sleeve 22. The spring 24 is so dimensioned relative to the inner peripheral surface of the housing (hereinafter referred to as the braking surface 26) to be normally in interference fit therewith. The switching sleeve 22 has abutment means in the form of two axially spaced, radially extending ears or tabs 28 and 28A which function to rotatively connect spring 24 to output drive shaft 16 and to engage the spring to effect release of spring 24 from its interference fit with braking surface 26 and, upon a predetermined torque load, allow the spring 24 to reengage braking surface 26 and thereby prevent rotation of input and output drive shafts 14, 16. An adjusting means 30 is provided on input drive shaft 14 to permit adjustment of the torque limiting means 18 to selected predetermined torque loads.

HOUSING

The housing 12, as best shown in FIGS. 1, 2, 6, 7, 8a and 8b, comprises a cup-shaped portion 32 and a disk-shaped end wall or cap 34. The cap 34 is fixed to the open end of portion 32 by a plurality of circumferentially spaced, radially extending tongues 36 of portion 32 which mate with grooves 38 in cap 34. A split ring 40 seats within registered, annular grooves 42 and 44 in portion 32 and cap 34, respectively, to secure cap 34 to portion 32. To facilitate insertion of split ring 40 in grooves 42 and 44, cap 34 is provided with an opening (not shown) communicating with the grooves 42 and 44 through which split ring 40 is fed into the grooves. The cup-shaped portion 32 has a plurality of radially extending ears 46 at the end opposite from cap 34 by which ears the drive and brake mechanism 10 is mounted to a structure (not shown), such as a wing spar. The inner peripheral surface of portion 32 serves as the braking surface 26. The cap 34 and portion 32 have coaxially aligned openings 48 and 50, respectively, in which bearings 52 and 54 are mounted for rotatively supporting input drive shaft 14 and output drive shaft 16.

INPUT AND OUTPUT DRIVE SHAFTS

Figure 3:
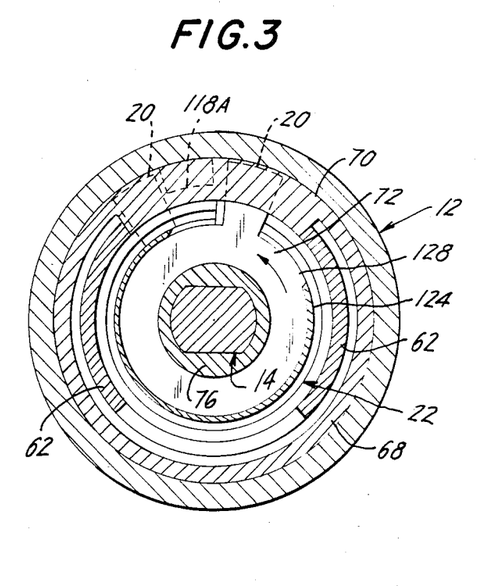
FIGS. 3, 4 and 5 are cross sectional views taken substantially along lines 3—3, 4—4 and 5—5, respectively, of FIG. 2, but on a somewhat smaller scale.
Figure 5:
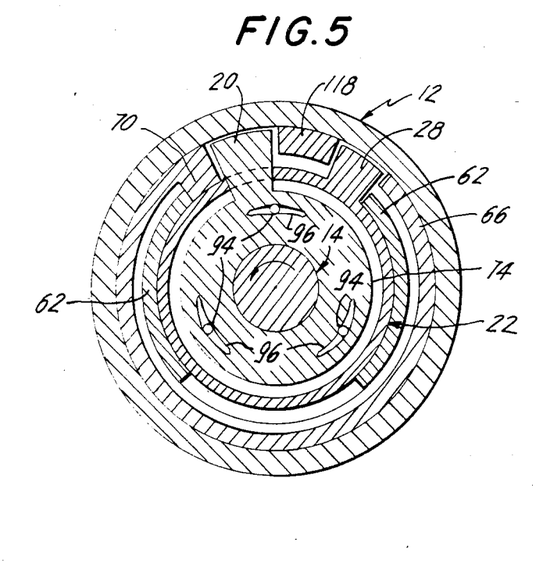
Figure 8A:
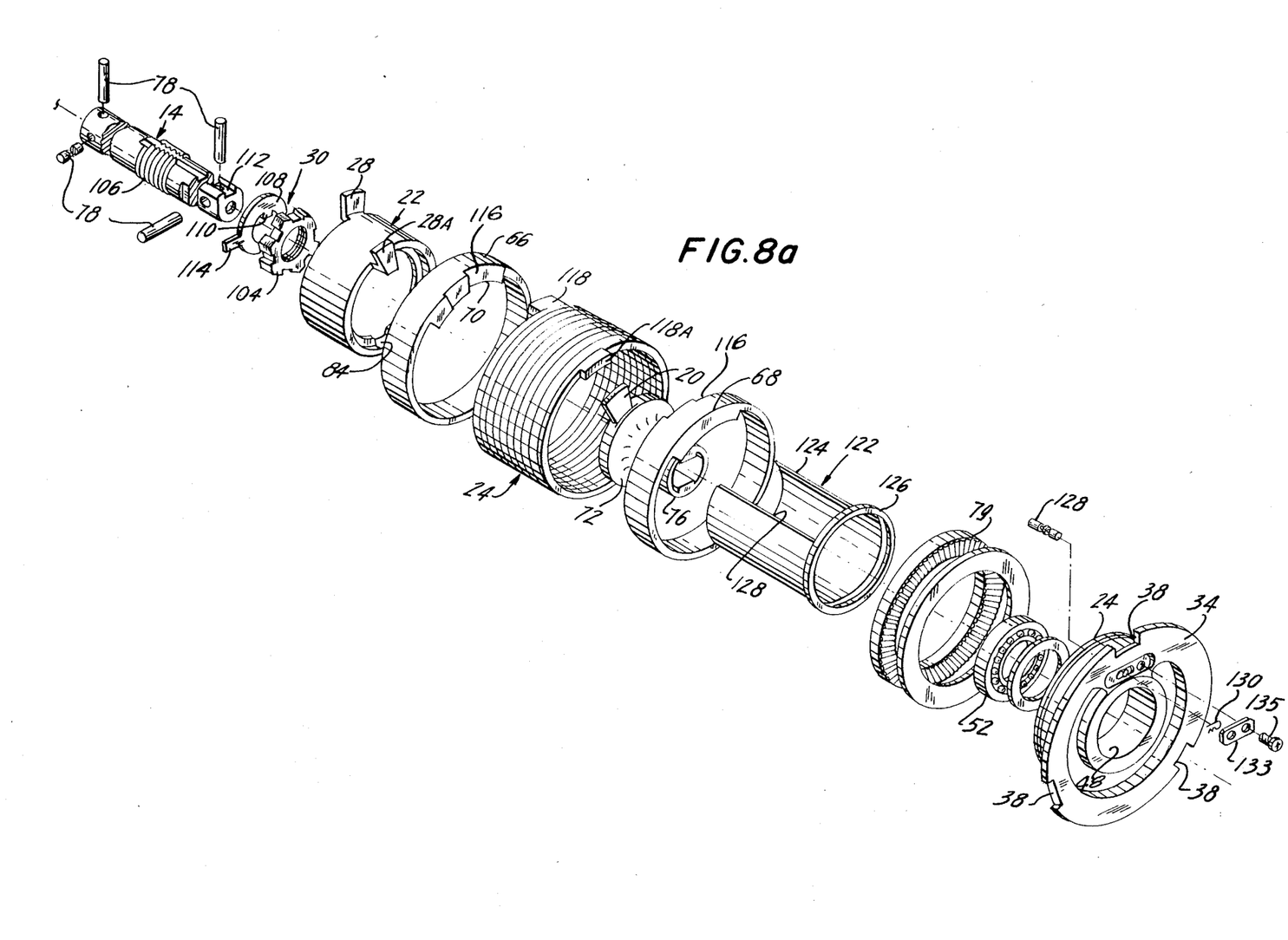
FIG. 8a is an exploded view of some of the component parts of the clutch mechanism.
Figure 8B:
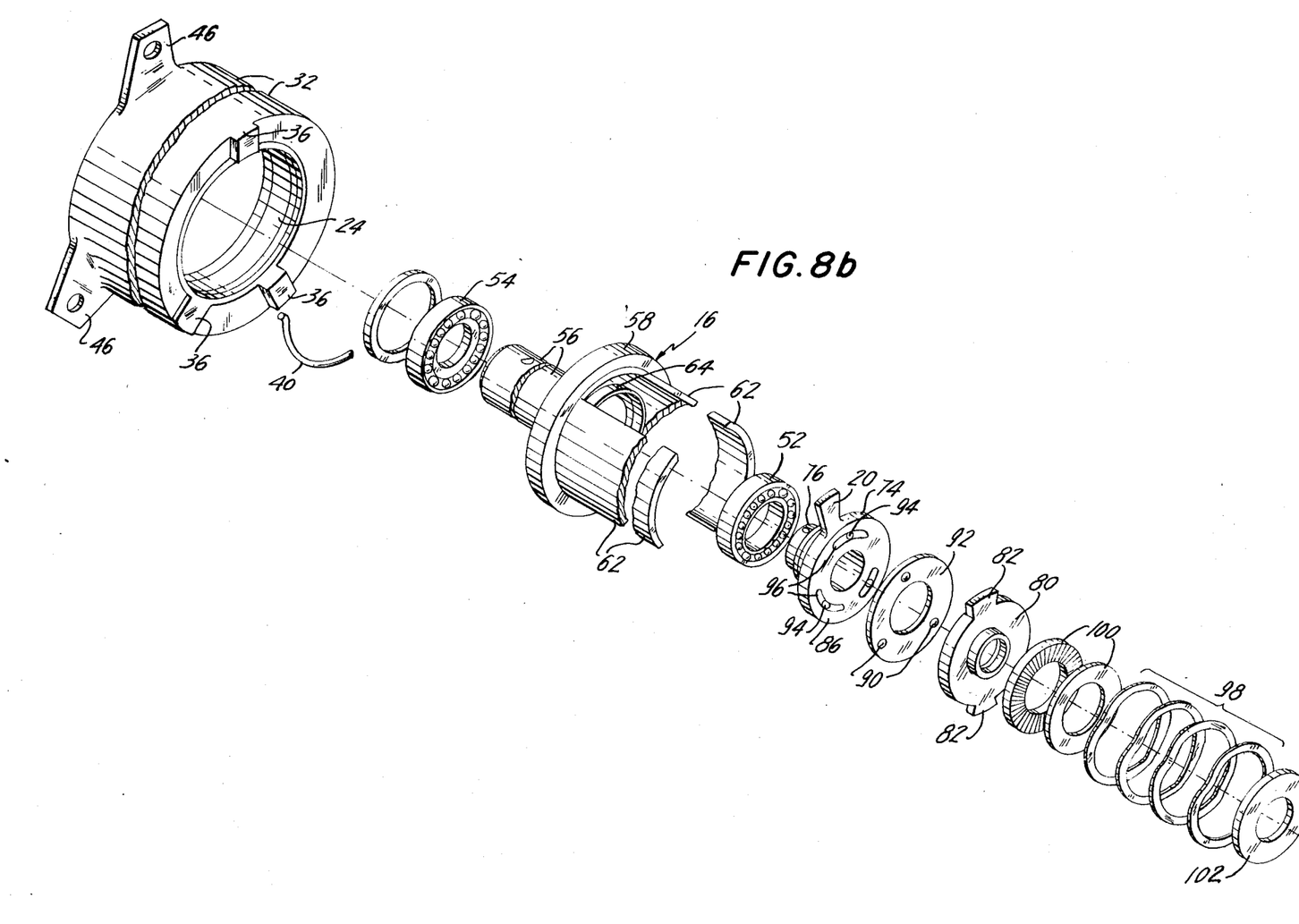

The input drive shaft 14 is shown as a solid elongated body while output drive shaft 16 is a hollow member having a cylindrical portion 56 projecting through opening 50 of the housing and an enlarged diameter, flanged portion 58 dimensioned for a close running fit within housing portion 32. A pair of juxtaposed, arcuate-shaped drive fingers 62 project coaxially from flanged portion 58 toward cap 34. The drive fingers 62 are spaced radially inwardly of the outer peripheral surface of flanged portion 58 so as to provide an arcuate space between the outer surfaces of the drive fingers 62 and braking surface 26 for switching sleeve 22 and spring 24 which overlie and surround drive fingers 62. The inner end portion of input drive shaft 14 is also journalled in a bearing 63 mounted in an internal hub portion 64 of output drive shaft 16. Also constituting part of the output drive shaft 16 are two spaced retaining rings 66 and 68 (see FIGS. 2 and 8a). For ease of manufacturing and assembly, these retainer rings are made as separate members from the output drive shaft 16, but are keyed to rotate with the drive fingers 62. As best shown in FIGS. 3, 5 and 8a, each retaining ring has an arcuate shaped portion of increased radial thickness extending inwardly, hereinafter referred to as a key portion 70, and which fits within the space formed between drive fingers 62 and abut the longitudinal edges of the fingers. The retaining rings 66 and 68 not only function to transmit torque but also serve to retain spring 24, collars 72 and 74 and drive cam 80 in a desired circumferential relationship to each other and the spring 24 in a desired longitudinal position in housing 12. An anti-friction bearing 79 is interposed between the inner surface of cap 34 and retaining ring 68.

TORQUE LIMITING MEANS

Figure 4:
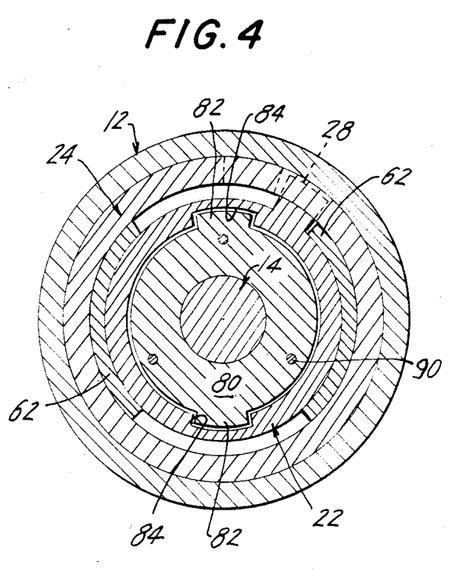

The torque limiting means 18 includes the drive means 20, which consists of two radially extending tangs which are formed integrally with each of two axially spaced, identical collars 72 and 74. Each of these collars 72 and 74 have an axially extending hub portion 76 and is secured for conjoined rotation to input drive shaft 14 by any suitable means, as for example a plurality of pins 78. Also, hub portions 76 provide a seat for bearings 52 and 63. Disposed adjacent collar 74 is a drive cam 80 which is connected for conjoined rotation to switching sleeve 22 by two diametrical, radially extending tongues 82 which engage complementary diametrically opposite grooves 84 in the inner surface of switching sleeve 22 (see FIGS. 4 and 8b). The tongue 82 and groove 84 connection (splined interconnection) permits drive cam 80 to maintain rotational engagement with switching sleeve 22 upon axial movement of the drive cam 80. Interposed between the juxtaposed faces 86 and 88 of the respective collar 76 and drive cam 80, are a plurality of balls 90 which are held in circumferentially spaced relationship to each other by a retaining ring 92. The faces 86 and 88 of collar 74 and drive cam 80, respectively, have for each ball 90 juxtaposed semi-spherical recesses 94 in which each ball seats for torque transmission. At least one of the faces, as shown face 86 of collar 74 (FIG. 5), has arcuate shaped inclined-ramp grooves 96 extending in opposite directions from each of the ball recesses. The drive cam 80 is biased axially toward collar 74 by Belleville spring washers 98 which are disposed over input drive shaft 14 and between an anti-friction bearing 100 and a pressure washer 102. It is apparent that, where the biasing force is not sufficient to retain balls 90 in their respective recesses 94, the collar 74 will angularly override drive cam 80 and the drive cam will be axially moved away from collar 74 as the balls ride on the inclined-ramp grooves 96. Coacting with the herein described torque limiting means 18 is an adjusting means 30.

ADJUSTING MEANS

The adjusting means 30 comprises a castellated nut 104 which is threaded on a threaded portion 106 of input drive shaft 14. The nut 104 applies axial force against pressure washer 102 which, in turn, places washers 98 under compression. The washers 98, in turn, via anti-friction bearing 100, exerts an axial force on drive cam 80 toward collar 74 to thereby squeeze balls 90 in their associated recesses 94. Thus, by turning nut 104 on the threaded shaft portion 106, the torque limiting means 18 can be adjusted to interrupt torque transmission at a wide variety of selected predetermined torque loads. To ensure retention of the adjustment, a locking washer 108 is provided adjacent nut 104 (see FIGS. 2 and 8a). The locking washer 108 is keyed to input drive shaft 14, via an internal tang 110 radially extending into a keyway 112 in input drive shaft 14. The locking washer 108 also has a tab 114 radially extending from its outer periphery, which tab is folded into the grooves of the castellations of the nut. Thus, the locking washer 108 prevents, through tang 110 and tab 114, relative rotation between the nut 104 and unput drive shaft 14 and thereby assures retention of the torque-limiting torque load adjustment. As previously set forth, drive cam 80 is in constant rotational engagement with the switching sleeve 22 through which torque is transmitted to the output drive shaft 16 in either direction of rotation of input drive shaft 14.

SWITCHING SLEEVE AND SPRING

Figure 6:
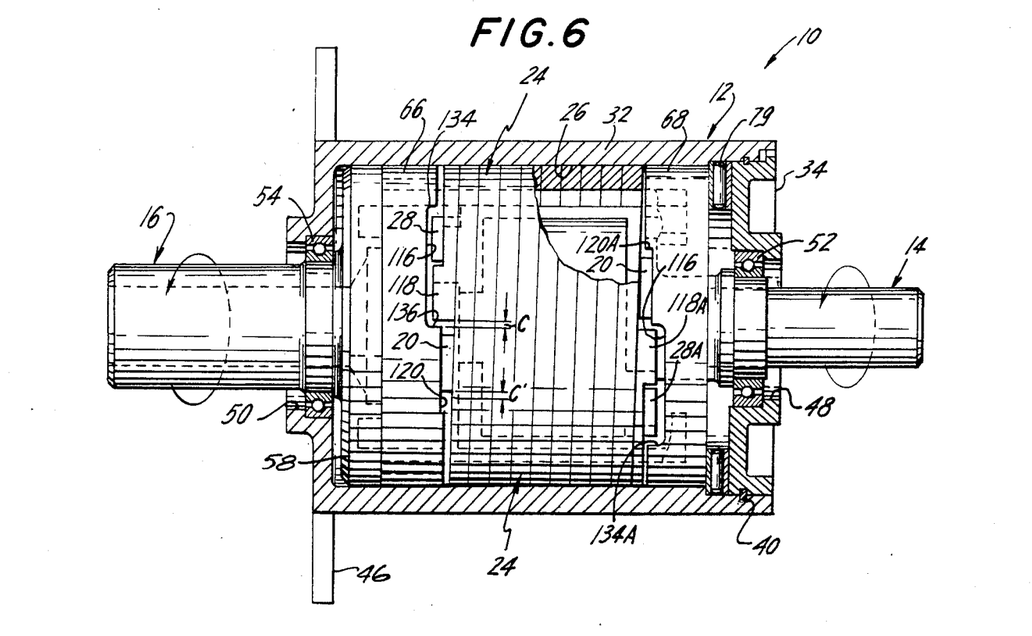
FIG. 6 is a top plan view of the drive and brake mechanism with the upper half of the housing cut-away and the other assembly components shown in elevation, the spring being broken away for illustration purposes only.

The switching sleeve 22, as is best shown in FIGS. 2, 5 and 6, has tabs 28 and 28A which are so dimensioned that each tab 28 and 28A projects radially outwardly into a stepped groove 116 (see FIG. 6) formed in the inner face of key portion 70 of the associated retaining ring 66 or 68 and in arcuate alignment with and adjacent to tangs 118 and 118A formed at each end of spring 24. The switching sleeve 22 is also dimensioned and positioned relative to collars 72 and 74 so that each of the tangs of the drive means 20 project radially outwardly between the end of spring 24 and the adjacent retaining ring 66 or 68 and in rotative alignment with a shoulder 120 formed by a first step in the stepped groove 116 of the associated retaining ring.

OVERLOAD INDICATOR

When the torque-limiting means 18 functions to interrupt torque at a predetermined torque load, an indicating means 122, provided in the drive and brake mechanism 10, is actuated. The indicating means 122 consists of a sleeve 124 which has an outwardly flanged end portion 126 and a longitudinal groove 128 extending from one end to a point adjacent the flanged end portion 126. This sleeve 124 is supported for axial reciprocative movement on collar 72 with the flanged end portion 126 disposed adjacent cap 34 of housing 12. It is dimensioned in length so that the end opposite from flanged portion 126 is spaced from drive cam 80, but sufficiently close to be engaged by the drive cam 80 when the latter is axially moved to the right as viewed in FIG. 2. When the predetermined torque load occurs to cause axial movement of drive cam 80 and spring 24 to reengage braking surface 26 and thus arrest rotation of input drive shaft 14, drive cam 80 abuts sleeve 124 and axially moves it to the right, as viewed in FIG. 2, and into abutment against indicator pin 128. After contact of sleeve 124 against the end of indicator pin 128, the continued movement of the sleeve 124 moves the indicator pin to the right until a hairpin shaped spring 130 snaps into an annular groove 132 in the pin. The spring 30 functions to hold indicator pin in the indexed position, even after the clutch mechanism returns to normal function, so that maintenance inspectors will become aware that an overload condition occurred and perform a more thorough inspection to ascertain the reason for the overload occurrence. A retaining plate 133 is receivable in a recess in the outer surface of cap 34 and is secured therein by a screw 135. This plate 133 serves to keep the indicator pin assembly within cap 34.

OPERATION

The drive and brake mechanism 10 functions to transmit rotation of input drive shaft 14 to output drive shaft 16 below a preselected torque load in the following manner. Assuming that input drive shaft 14 is being driven by a source of bidirectional rotary power, such an electric, pneumatic or fluid motor, in a counter-clockwise direction as shown by the arrows in FIGS. 2, 3, 5 and 6, collars 72 and 74 which are pinned to input drive shaft 14 are rotated in a counter-clockwise direction. This rotation is transmitted from collar 72 to drive cam 80, via balls 90, of the torque-limiting means 18. Since drive cam 80 is rotationally connected to switching sleeve 22 by tongues 82 and grooves 84, switching sleeve 22 is rotated. As best seen in FIG. 6, rotation of switching sleeve 22 causes tab 28, adjacent retaining ring 66, to move into abutment against tang 118 of spring 24 and to cause, with further rotative movement, the coils of spring 24 to contract, the opposite end of the spring being held against movement by the tang 118A and tab 28A of collar 72 coming into abutment against a radial shoulder 134A formed by stepped groove 116 in retaining ring 68. This contraction of the coils of spring 24 moves the spring out of interference fit with braking surface 26. After sufficient rotative movement to release the springs grip on housing 12, the tang of drive means 20 on collar 74 abuts a radial shoulder 120 of stepped groove 116 of retaining ring 66. Since retaining ring 66 is keyed to output drive shaft 16 by the key portion 70 engaging the longitudinal edges of fingers 62 of the output drive shaft 16, the latter is thus directly rotatively driven in the counter-clockwise direction. At this time, with spring 24 disengaged from braking surface 26, it is rotatively carried by the retaining rings 66 and 68 as output drive shaft 16 is rotated.

The sequence of operation as herein set forth is achieved because a lost-motion clearance C between tang 118 and intermediate shoulder 136 of stepped groove 116 of retaining ring 66 is sufficient to allow enough arcuate movement of spring tank 118 relative to retaining ring 66 to effect contraction of the coils of spring 24 and complete disengagement from braking surface 26 before abutment against shoulder 136. Also the clearance C' between tang drive means 20 and shoulder 120 is greater than clearance C so that unbraking of spring 24 is achieved before driving of retaining ring 66 and output drive shaft 16.

When input drive shaft 14 is rotated in the clockwise direction (opposite from the arrows shown in FIGS. 2, 3, 5 and 6), the spring 24 is caused to disengage from braking surface 26 by tab 28A of switching sleeve 22 engaging tang 118A of spring 24 adjacent retaining ring 68, the opposite end of the spring being held by action of tang 118 abutting tang 28 which, in turn, abuts shoulder 134 formed by stepped groove 116 in retaining ring 66. With the spring 24 out of its braking position, the output drive shaft 16 is rotated in the clockwise direction, via the tang drive means 20 of collar 72 abutting radial shoulder 120A of retaining ring 68 and rotatively driving the latter.

Assuming a counter-clockwise transmission of torque from input drive shaft 14 to output drive shaft 16 during which time a torque load develops in the drive and brake mechanism which is at or greater than the preset torque load of torque limiting means 18, collar 74 of drive means 20 rotatively overrides drive cam 80. In so doing, balls 90 ride out of the recesses 94 and along the arcuate, inclined-ramps 96 thereby moving drive cam 80 to the right, as viewed in FIGS. 2, 6 and 7, against the biasing force of Belleville spring 98. The tangs 28 of switching sleeve 22 ceases to rotate with tang drive means 20 (the switching sleeve having stopped rotative movement because rotation is no longer transmitted to the output drive cam 80 and from the latter to switching sleeve 22). At the opposite end of spring 24, tang drive means 20 of collar 72 continues to move as does tang drive means 20 of collar 74 and with the rotative force on tang 118 thus relieved because the spring rotates away from abutment with tang 28, the coils of spring 24 are allowed to re-expand into interference fit with braking surface 26 and thereby block rotation of input drive shaft 14, through tang drive means 20, and also reverse rotation through output drive shaft 16 by reason of the abutment of shoulder 136 of retaining sleeve 66 against spring tang 118 in a direction to expand the coils of the spring.

As previously described, axial movement of drive cam 80, upon a predetermined torque load being reached, axially moves indicator sleeve 124 which, in turn, axially moves indicator pin 128 outwardly of the outer surface of cap 34. This extension of pin 128 from the cap 34, where it is held by a spring 130, alerts inspectors to the fact that the drive and brake mechanism was subject to a torque overload condition.

It is believed now readily apparent that the present invention provides a bidirectional, torque limiting, drive and brake mechanism which is capable of field adjustment of the torque load at which interruption of torque transmission will occur. It is a clutch mechanism 10 wherein rotation in each direction of rotation is transmitted from an input drive shaft to an output drive shaft by a direct mechanical connection and not through a helical spring. It is a mechanism which is relatively simple and compact in construction with all of the parts and components thereof within a housing and thereby protected against dirt, damage and malfunction.

It is not the intention hereof to restrict applications of the invention by the figures and description thereof, but rather it should be understood that the present disclosure is to illustrate the concepts and principles of the present invention and that changes or alterations thereto obvious to one skilled in the art would still come within the scope of this disclosure. Also, it should be understood that the figures are deliberately not drawn to scale and are exaggerated in some respects for clarity. Therefore, although a preferred embodiment of the apparatus of the present invention has been herein disclosed, it should be obvious that the present disclosure is made by way of example only and that variations are possible without departing from the subject matter coming within the scope of the following claims, which claims are regarded as the invention.

What is claimed is:

1. A bidirectional, torque-limiting, drive and brake mechanism comprising:
   (a) a housing having a fixed braking surface;
   (b) an input drive means supported for rotation by said housing and connected to a source of bidirectional power to rotate the input drive means;
   (c) an output drive means supported for rotation by said housing;
   (d) a helically wound spring in said housing and constructed and arranged to be in normal interference fit with said braking surface;
   (e) torque limiting means interconnecting in one operative position said input and output drive means for transmitting rotation from the input drive means to the output drive means and in another operative position interrupting such transmission of rotation when a predetermined torque load is reached; and
   (f) a switching sleeve disposed in said housing and connected to said torque limiting means for conjoined rotation with the latter and having a spring engaging means for engaging opposite ends of the spring and effect release of the spring from said braking surface and thereby permit transmission of rotation from the input drive means to the output drive means and, upon a predetermined torque load and when said transmission of rotation between the input and output drive means ceases, allows said spring to reengage the braking surface and thereby prevent rotation of the input drive means and the output drive means.

2. The apparatus of claim 1 wherein an adjustment means is provided which coacts with the torque-limiting means to effect adjustment of the latter for a selected predetermined torque load value at which rotary transmission is interrupted.

3. The apparatus of claim 1 wherein said torque-limiting means includes a first means rotatable with the input drive means, a second means rotatably connected to the switching sleeve and axially slidable relative to the switching sleeve and the first means, a camming means disposed between said first and second means to cam said second means axially upon a predetermined torque load.

4. The apparatus of claim 3 wherein a spring biasing means is disposed adjacent said second means to urge said second means in a direction of the first means.

5. The apparatus of claim 4 wherein an adjustment means is disposed to coact with said biasing means to adjust the force exerted by the latter against said second means in accordance with the selected predetermined torque load at which transmission of rotation is to be interrupted.

6. The apparatus of claim 3 wherein said input drive means is a drive shaft and said first means comprises two collars secured in axial spaced relation to the drive shaft for conjoined rotation with the latter.

7. The apparatus of claim 6 wherein each of the two collars has a radially extending tang which rotatively engages the output drive means to transmit rotation to the latter.

8. The apparatus of claim 1 wherein said output drive means comprises a drive shaft having a radial flanged portion from which axially extend two diametrically spaced fingers.

9. The apparatus of claim 8 wherein said output drive means includes two retaining rings supported on the fingers, one at each end of said helically wound spring, and keyed to said fingers for conjoined rotation with the latter.

10. The apparatus of claim 9 wherein each of said retaining rings are identical and each has a stepped groove for confining the adjacent spring end and spring engaging means to limited rotative movement.

11. A bidirectional torque-limiting, drive and brake mechanism comprising
   (a) a housing having a braking surface;
   (b) an input drive means connected to a source of bidirectional rotary power and an output drive means supported for rotation in said housing;

(c) a helically wound spring in said housing and surrounding said input and output drive means and in normal interference fit with the braking surface of said housing;

(d) torque limiting means, including a first and a second part, disposed between said input drive means and said output drive means for transmission in one operative position of torque from the input drive means to the output drive means and, in another operative position, interruption of such torque transmission when a predetermined torque load is reached;

(e) said first part of said torque limiting means being connected to said input drive means for conjoined rotation with the latter and having a first abutment means for transmitting torque to the output drive means in the same direction as the direction of rotation of said input drive means;

(f) a switching sleeve surrounding and substantially coaxial with the input and output drive means and within and substantially coextensive with said spring; and (g) said switching sleeve being rotatively connected to said second part of said torque limiting means for conjoined rotations with said second part and having a second abutment means engaging the opposite end of the spring and connecting said spring to the output drive means and to cause the spring to contract and disengage from said braking surface and thereby release said first abutment for rotation of said output drive means and, upon a predetermined torque load, allowing said second abutment to permit the spring to expand and reengage the braking surface and thereby prevent rotation of the input and output drive means.

12. The apparatus of claim 11 wherein an adjustment means is provided which coacts with the torque-limiting means to adjust the latter for selected predetermined torque load values at which torque transmission is interrupted.

13. The apparatus of claim 11 wherein said torque limiting means is of the ball and inclined-ramp type consisting of a plurality of circumferentially spaced balls supported between the first and second parts of the torque-limiting means for movement in arcuate shaped inclined ramps formed in at least one of the surfaces of the first and second parts and wherein said second part is supported for rotative movement and for axial movement under the urging of the balls when the first part rotatively overrides the second part.

14. The apparatus of claim 11 wherein said output drive means includes a retaining ring disposed at each of the opposite ends of the helical spring and rotatively carried by the output drive means.

15. The apparatus of claim 14 wherein each of the retaining rings has spaced radially extending shoulders located so as to be engaged by said first abutment means and the ends of the spring.

* * * * *